United States Patent [19]
Pedersen et al.

[11] Patent Number: 5,197,231
[45] Date of Patent: Mar. 30, 1993

[54] ROTARY CUTTER HAVING EXPANDED CUTTING RING

[75] Inventors: Harry Pedersen, Penfield; Richard Johnstone, Fairport; Richard L. Kitchen, East Rochester, all of N.Y.

[73] Assignee: The Gleason Works, Rochester, N.Y.

[21] Appl. No.: 805,125

[22] Filed: Dec. 11, 1991

[51] Int. Cl.$^5$ ............................................. B24D 17/00
[52] U.S. Cl. .................................. 51/204; 51/209 R
[58] Field of Search ................. 51/204, 209 R, 367, 51/372, 375, 380

[56] References Cited

U.S. PATENT DOCUMENTS

| | | |
|---|---|---|
| 1,472,565 | 10/1923 | Manning . |
| 2,129,077 | 9/1938 | Wildhaber . |
| 2,341,094 | 2/1944 | Hackman et al. ............... 51/372 |
| 2,426,699 | 9/1947 | Luther ............................ 51/372 |
| 2,828,672 | 4/1958 | McMullen . |
| 2,994,943 | 8/1961 | Carlsen et al. . |
| 3,138,996 | 6/1964 | Dammert et al. . |
| 4,061,076 | 12/1977 | Robertson . |
| 4,204,787 | 5/1980 | McCray et al. . |
| 4,575,286 | 3/1986 | Blakesley . |

FOREIGN PATENT DOCUMENTS

| | | |
|---|---|---|
| 311216 | 12/1990 | Japan ............................ 51/372 |
| 1399015 | 5/1988 | U.S.S.R. . |
| 469616 | 7/1937 | United Kingdom ........... 51/372 |

Primary Examiner—M. Rachuba
Attorney, Agent, or Firm—Robert L. McDowell; Ralph E. Harper

[57] ABSTRACT

Disclosed herein is a rotary cutter for cutting gears and the like. The rotary cutter has an axis of rotation and comprises a disc-shaped cutter head having a circumferential edge surface. The cutter head further includes an inner wall surface located radially inwardly with respect to the edge surface and being concentric about and extending parallel to the axis of rotation. The rotary cutter further includes a cutter ring located on the cutter head. The cutter ring has at least one stock removing surface located on a base portion with the base portion having an inside ring surface, an outside ring surface, and a base surface with the outside ring surface being perpendicular to the base surface. The cutter ring is in a radially expanded condition whereby the outside ring surface is seated against the inner wall surface of the cutter head and the base surface is seated against the first surface of the cutter head. The cutter ring is expanded by an expanding means located within the cutter ring and contacting the inside ring surface. The expanding means effects and maintains the cutter ring in a radially expanded position whereby the cutter ring is centered on the cutter head concentrically about the axis of rotation.

38 Claims, 2 Drawing Sheets

ROTARY CUTTER HAVING EXPANDED CUTTING RING

FIELD OF THE INVENTION

The present invention is directed to rotary cutters, particularly ring cutters, utilized in the processes of cutting gears, couplings and the like.

BACKGROUND OF THE INVENTION

Ring cutters have been known for many years in the art of milling and, in particular, gear cutting. U.S. Pat. No. 2,129,077 to Wildhaber discloses a cutter comprising a continuous, closed ring mounted to the nose of a cutter spindle. The ring cutter is stated to be very stiff due to the continuous ring and accurately concentric due to the fact that the teeth are ground in place.

It can be seen that producing the teeth of a ring cutter in place is advantageous since this approach eliminates the need to assemble a cutter by placing and positioning individual blades in a cutter head, such as illustrated by U.S. Pat. No. 4,575,286 to Blakesley, or, mounting blades about the periphery of a cutter head, such as illustrated by U.S. Pat. Nos. 2,994,943 to Carlsen et al. or 3,138,996 to Dammert et al.

However, mounting a cutter ring on a spindle as disclosed by previously mentioned U.S. Pat. No. 2,129,077 or mounting a cutter ring on a cutter head as disclosed by U.S. Pat. Nos. 2,828,672 to McMullen or 4,204,787 to McCray et al. requires a precise fit of the cutter ring base and side mounting surfaces to the mounting surfaces of the spindle or head.

If a cutter ring is not precisely mounted to a cutter head or machine spindle, the cutter ring will not rotate true about the axis of rotation of the machine spindle. This nbn-true rotation, known as run-out, can occur radially and/or axially with respect to the axis of rotation of the cutter head and machine spindle. A cutter ring rotating in this manner will result in imprecisely formed tooth geometry on a workpiece, such as a gear or gear blank.

It is an object of the present invention to provide a rotary ring cutter wherein the cutter ring will be concentric with the axis of rotation of the rotary cutter.

It is another object of the present invention to provide a rotary ring cutter which offers rapid assembly and disassembly as well as repeatable accurate placement of a cutter ring on a cutter head.

SUMMARY OF THE INVENTION

The present invention is directed to rotary cutters for cutting gears, couplings and the like such as by milling, hobbing or grinding, and in particular to rotary cutters having a cutter ring comprising a circular base portion with at least one stock removing surface located thereon. The present invention enables a cutter ring to be centered on a cutter head and to thereby rotate true in both the radial and axial planes about an axis of rotation during a gear forming process.

The rotary cutter of the present invention has an axis of rotation and comprises a disc-shaped cutter head having a circumferential edge surface and a first surface located on one side of the cutter head with the axis of rotation extending through the center of said cutter head. The first surface is perpendicular to the axis of rotation. The cutter head further includes an inner wall surface located on the one side with the inner wall surface being located radially inwardly with respect to the edge surface and being concentric about and extending parallel to the axis of rotation.

The rotary cutter of the present invention further includes a cutter ring located adjacent to the one side of the cutter head. The cutter ring has at least one stock removing surface located on a base portion with the base portion having an inside ring surface, an outside ring surface, and a base surface with the outside ring surface being perpendicular to the base surface. The cutter ring is in a radially expanded condition whereby the outside ring surface is seated against the inner wall surface and the base surface is seated against the first surface.

The cutter ring is expanded by an expanding means located within the cutter ring and contacting the inside ring surface. The expanding means effects and maintains the cutter ring in a radially expanded position whereby the cutter ring is centered on the cutter head concentrically about the axis of rotation.

DETAILED DESCRIPTION OF THE PREFERRED EMBODIMENT

The present invention will now be discussed with reference to the accompanying Drawings.

Figure 1:
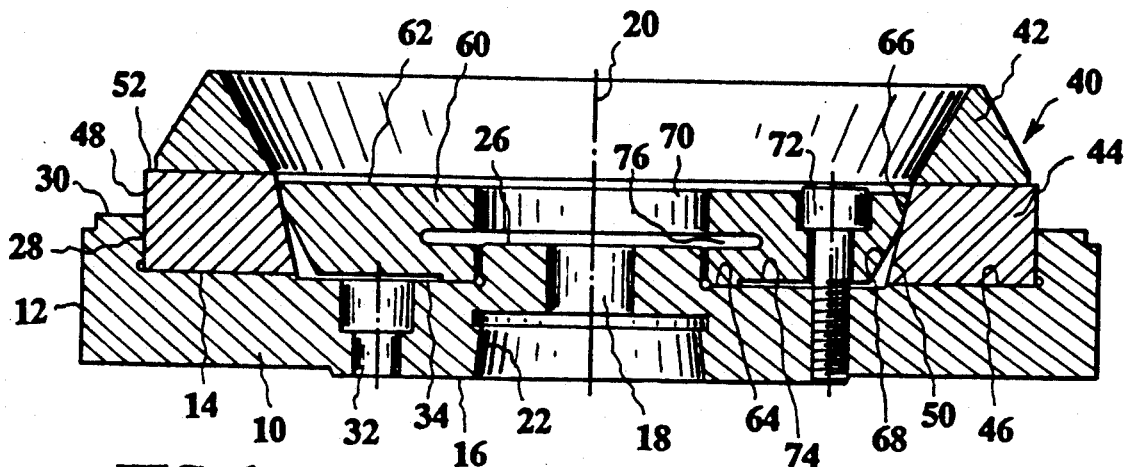
FIG. 1 schematically illustrates a cross-sectional view of the preferred embodiment of the present invention.

FIG. 1 illustrates a cross-sectional view of the preferred embodiment of the present invention. The rotary ring cutter may be utilized for roughing and/or finishing operations and comprises a generally disc-shaped cutter head 10, preferably made of a non-tool steel. The cutter head 10 comprises a circumferential edge surface 12, a first surface 14 located on a slightly raised offset portion of one side of the generally disc-shaped cutter head 10, and a second surface 16 located on the other side of the cutter head 10. The first surface 14 and the second surface 16 are parallel to one another.

The cutter head 10 also includes an opening 18 arranged about an axis of rotation 20 which extends through the center of the cutter head 10 from the one side to the other side. The axis 20 coincides with the axis of rotation of a machine tool spindle (not shown) to which the rotary cutter is to be mounted. First surface 14 and second surface 16 are perpendicular to the axis 20.

In mounting the rotary cutter to a machine tool spindle, the tapered bore 22, which is concentric about axis 20, engages the machine tool spindle nose and the second surface 16 of the cutter head abuts against the face of the spindle such that the second surface 16 is perpendicular to axis 20. The spindle face may include a key (not shown) which is inserted into a keyway (not shown) in the second surface 16 to assist in the transmittal of torque from the spindle face to the cutter head 10. A bolt 24 (shown in FIG. 3) extends from a seating surface 26 through the central opening 18 and is threaded into the end of the spindle nose.

The cutter head 10 also includes an inner wall surface 28 located on the one side of the cutter head 10 and spaced radially inwardly from the circumferential edge surface 12. The inner wall surface 28 is concentric about the axis 20 and extends in a direction parallel thereto. Surface 30 extends between the inner wall surface 28 and the circumferential edge surface 12. Surface 30 may be perpendicular to axis 20 and circumferential edge surface 12 may be parallel to axis 20.

Also located in cutter head 10 is at least one access hole 32 for placement of an ejector screw (not shown) for removing the cutter head 10 from a machine tool spindle. The access hole 32 may be tapped in order that the ejector screw may be threaded thereinto.

An elastically expandable cutter ring 40 is located on the one side of the cutter head 10. The cutter ring 40 comprises at least one stock removing surface 42 arranged on a circular base portion 44. The stock removing surface may comprise a grinding surface, made of aluminum oxide or cubic boron nitride (CBN) for example, or, the stock removing surface may comprise cutting blades, made of high speed steel, powder metal, carbides or ceramics for example. The stock removing surface 42 may be removably attached to the circular base portion 44, made of high speed steel for example, or, the stock removing surface 42 and the circular base portion 44 may be formed as a singular unit such as by casting or milling from a solid piece of metal. Cutter ring base portion 44 includes a base surface 46, outside ring surface 48 and an inside ring surface 50. Base surface 46 is perpendicular to outside ring surface 48. In FIG. 1, inside ring surface 50 is tapered inwardly in a direction toward first surface 14, at an angle of about two to about twenty degrees for example. Although a tapered inside ring surface is preferred, it is to be understood that cutter rings having parallel bore surfaces may also be utilized in the present invention.

In the assembly of the rotary cutter of the present invention, the cutter ring 40 is placed on the cutter head 10 within the inner wall surface 28. The initial diameter of the cutter ring 40 is less than the diameter defined by the inner wall surface 28 by an amount of about 0.0015–0.0040 inches. After the cutter ring 40 is placed on the first surface 14, a deflectable circular disc 60 is placed inside of the cutter ring 40 and clamped to the cutter head 10 thereby effecting and maintaining the cutter ring 40 in an expanded condition and centering the cutter ring 40 on the cutter head 10. Unclamping the circular disc 60 allows the elastic cutter ring 40 to return to its original dimension thereby permitting its removal from the cutter head 10.

The circular disc 60 comprises, with respect to the cutter head 10, a top surface 62, a bottom surface 64 which contacts the slightly lower offset portion 34 of the one side of the cutter head 10, and a tapering outer side surface having an upper generally curved portion 66 and a lower linear portion 68. The circular disc 60 includes a center hole 70 to allow a bolt 24 (FIG. 3) to fit within for mounting the rotary cutter to a machine tool spindle. The lower linear portion 68 is inclined with respect to the axis 20, preferably at about thirty (30) degrees thereto, while the upper generally curved portion 66 preferably has about a one (1) inch radius of curvature. The circular disc 60 also includes at least one relief surface, discussed below, which allows it to deflect as it is clamped.

The circular disc 60 is secured to the cutter head 10 by a plurality of securing means, such as screws 72 spaced about the circular disc 60. At least six, and preferably eight, screws are equidistantly spaced about the circular disc 60. Tightening of the screws 72 deflects the circular disc in a direction toward the cutter head 10 thus causing the upper generally curved portion 66 of the circular disc 60 to slide along the tapered inside ring surface 50. This movement of the upper generally curved portion 66 effects a radial expansion of the cutter ring 40. The circular disc 60 is deflected toward the cutter head 10 thus causing the cutter ring 40 to radially expand to the point where the outside surface 48 of the cutter ring 40 is seated against the inner wall surface 28 of the cutter head 10. The movement of the generally curved portion 66 along the tapered inside ring surface 50 also effects force in a direction toward the cutter head such that the base surface 46 of the cutter ring base portion 44 is seated against the first surface 14 of the cutter head 10. Once the surfaces 46 and 48 of the cutter ring 40 are seated against the surfaces 14 and 28 of the cutter head 10, the cutter ring is centered on the cutter head 10 and, therefore, it will rotate concentrically about axis 20.

Surface 52 and outside ring surface 48 may serve as proof surfaces and extend, respectively, perpendicular and parallel to the axis of rotation 20 of the cutter ring 40. The proof surfaces are precisely formed on the cutter ring and extend completely therearound. These surfaces are used during the manufacture of the cutter ring 40 to ensure that the cutter ring is correctly loaded onto the heads of machines utilized to produce them. Any foreign material, such as dirt, between the cutter ring and the machine head or any damage to the ring will cause run-out in the rotation of the cutter ring, that is, the cutter ring will not rotate concentrically about its axis of rotation. Gauges (not shown) contacting proof surfaces 52 and 48 indicate any deviations from concentricity about the axis of rotation during the manufacture of the cutter ring 40. The proof surfaces 52 and 48 may also be used after assembly of the ring cutter or after the ring cutter is mounted to the spindle of a machine tool in order to check for deviations from concentricity. As with manufacture, dirt located between adjacent mounting surfaces or damage to the mounting surfaces may cause the cutter ring 40 to depart from concentricity about the axis of rotation 20.

Figure 2:
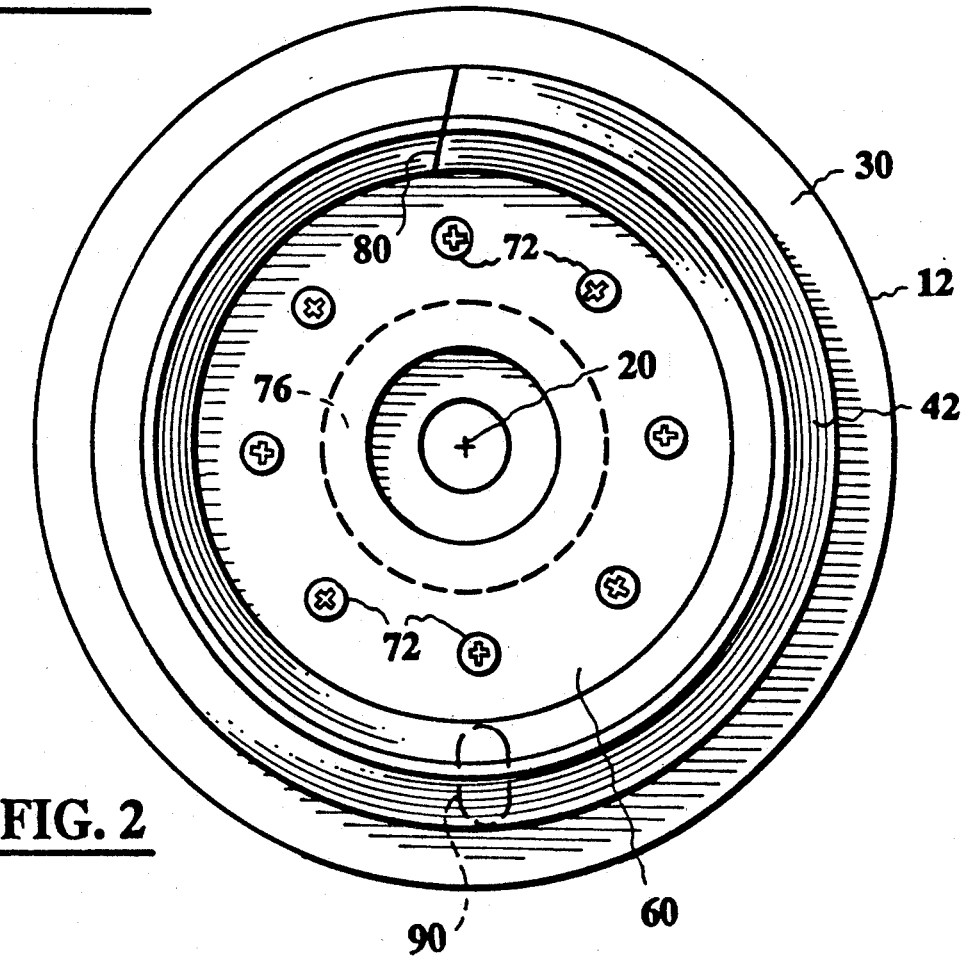
FIG. 2 schematically illustrates a top view of the preferred embodiment.

In some instances, the cutter ring 40 may not be capable of being satisfactorily expanded by the circular disc 60. Primary factors contributing to this predicament are the radial thickness of the base portion and the distance from the axis of rotation to the cutter ring. For example, a thick cutter ring base portion and a small radial distance from the axis to the cutter ring will make expansion of the cutter ring very difficult. In this case, the cutter ring 40 may be slit to allow it to expand and seat against inner wall surface 28. FIG. 2 illustrates such a cutter ring wherein a slit 80 is formed in the ring and extends in a generally radial direction. The slit 80 may be formed by electrical discharge machining (EDM) or any other slitting process that does not cause metallurgical degradation of the steel adjacent to the slit 80. FIG. 2 also shows eight screws 72 arranged equidistantly about the circular disc 60 and extending through the circular disc 60 and into threaded engagement with the cutter head 10. A key and keyway arrangement 90 located, respectively, in the cutter head 10 and the cutter ring 40 is also schematically illustrated. This arrangement assists in the transmittal of torque between the cutter head 10 and the cutter ring 40.

The circular disc 60 includes one or more relieved portions to allow the circular disc 60 to deflect as the screws 72 are tightened. One such relieved portion is located on the bottom surface 64 of the circular disc 60. The relieved surface 74 is continuous about bottom surface 64 and extends from the bottom linear portion 68 radially inwardly to a point inward of the screws 72.

Along with the relieved surface 74, another relieved portion is preferably included in the present invention. This relieved portion encircles the center hole 70 and extends radially outward therefrom. The relieved portion is in the form of a continuous slot 76 located about halfway between the top surface 62 and the bottom surface 64 of the circular disc 60. The slot 76 extends radially outward from the center hole 70 and ends at a point inwardly of the screws 72. See FIG. 2. Preferably, the slot extends radially outward about one-half ($\frac{1}{2}$) inch. This slot 76 allows the circular disc 60 to deflect with less clamping force than is required if only relief surface 74 is present.

The rotary ring cutter of the present invention is made by soft turning and milling the cutter ring. The cutter ring 40 is then hardened by heat treating and a slit 80, if needed, is cut radially through the cutter ring at a location opposite of the keyway 90. The bottom surface 46 of the cutter ring is then ground followed by grinding of the tapered inside ring surface 50 and the outside ring surface 48. The cutter ring 40 is then mounted on the cutter head, on which surfaces 14, 16 and 28 have been precisely formed by grinding, for example, and the desired stock removing surfaces 42 are formed on the cutter ring 40, for example, blade surfaces are relief ground.

Surfaces 14, 16, 46 and 52 are precisely formed, such as by grinding, to be perpendicular to the axis 20 and the face of a machine tool spindle so that when cutter ring 40 is secured to cutter head 10 by deflection of the circular disc 60 and mounted to a machine tool spindle, the rotary cutter will rotate true in the axial plane of a machine tool spindle axis. Since the cutter ring 40 is also centered on the cutter head 10, due to the precisely formed surfaces 28 and 48 parallel to axis 20, the rotary cutter will also rotate true in the radial plane of the machine tool spindle axis.

Figure 3:
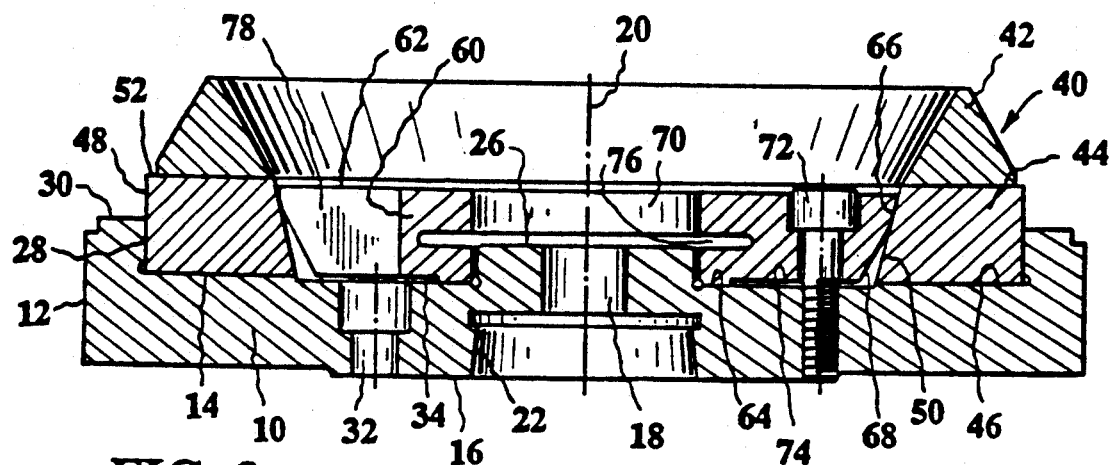
FIG. 3 schematically illustrates a cross-sectional view of an alternative embodiment of the present invention.
Figure 4:
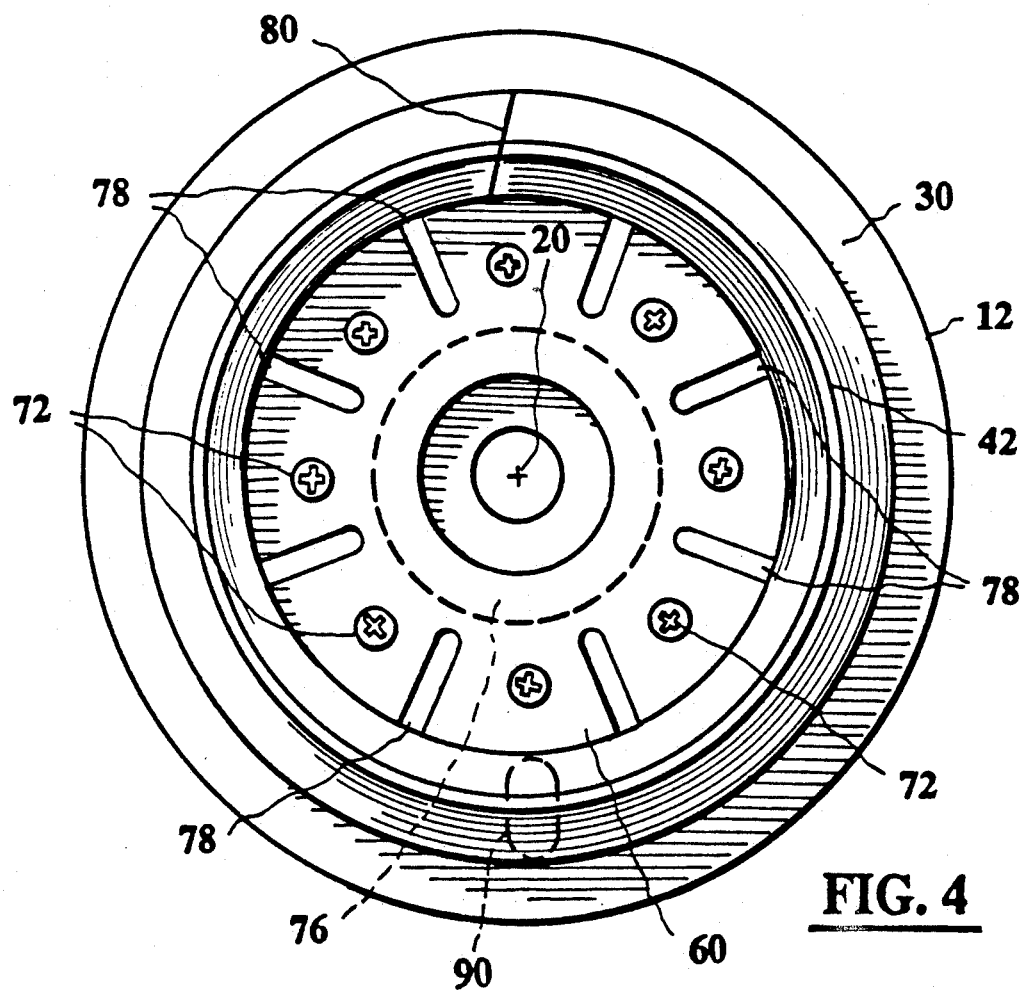
FIG. 4 schematically illustrates a top view of the alternative embodiment.

FIG. 3 illustrates an alternative embodiment of the present invention wherein identical reference numbers are utilized to refer to like components. In this embodiment, the circular disc 60 includes a plurality of relief slots 78 located spaced about the periphery between the screws 72. These relief slots 78 may be utilized with the previously discussed relief surface 74. The relief slots 78 may also be used along with the continuous slot 76 discussed above. Each of the slots 78 extends the thickness of the circular disc 60 and projects radially inwardly to a point beyond the screws 72. See FIG. 4. These additional slots 78 allow for even less clamping force to be utilized in order to deflect the circular disc 60. The additional slots 78 also allow greater deflection of the circular disc 60 which may be needed for expansion of cutter rings having parallel bore surfaces for example.

In another alternative embodiment, the circular disc 60 may have no relief surfaces and be of a dimension whereby when it is placed inside the cutter ring 40, the circular disc will lodge at some position intermediate the upper and lower ends of the inside ring surface 50. That is, at a position where there will be no contact between the bottom surface 64 and the slightly lower offset portion 34 of the cutter head 10. Tightening of screws 72 will then pull the circular disc 60 toward cutter head 10 resulting in the expansion of cutter ring 40 as the generally curved upper portion 66 slides along the inside ring surface 50.

The rotary cutter of the present invention represents a rapid and less complicated manner to assemble and disassemble a rotary cutter. The present invention also represents a means to ensure that the stock removing surfaces of the rotary cutter rotate true about the axis of rotation thereof.

While the invention has been described with reference to preferred embodiments it is to be understood that the invention is not limited to the particulars thereof. The present invention is intended to include modifications which would be apparent to those skilled in the art to which the subject matter pertains without deviating from the spirit and scope of the appended claims.

What is claimed is:

1. A rotary cutter for cutting gears and the like, said rotary cutter having an axis of rotation and comprising:

a generally disc-shaped cutter head comprising a circumferential edge surface, a first surface located on one side of said cutter head and a second surface located on the other side of said cutter head with said axis of rotation extending from said one side to said other side through the center of said cutter head, said first and second surfaces being parallel to one another and perpendicular to said axis, said cutter head further including an inner wall surface located on said one side, said inner wall surface being located radially inwardly with respect to said edge surface and being concentric about and extending parallel to said axis of rotation, a cutter ring having a slit therethrough, said cutter ring being located adjacent said one side of said cutter head, said cutter ring having at least one stock removing surface located on a base portion with said base portion having a tapered inside ring surface, an outside ring surface, and a base surface with said outside ring surface being perpendicular to said base surface, said cutter ring being in a radially expanded condition whereby said outside ring surface is seated against said inner wall surface and said base surface is seated against said first surface, a circular disc having a base and a tapered outer side surface concentric with said axis, said circular disc being located within said cutter ring and secured to said cutter head via securing means, said tapered outer side surface contacting said tapered inside ring surface, said circular disc effecting and maintaining said cutter ring in said radially expanded position whereby said cutter ring is centered on said cutter head concentrically about said axis.

2. The rotary cutter of claim 1 wherein said circular disc comprises a top surface, a tapered outer side surface and a bottom surface with a portion of said bottom surface comprising a relief surface, said relief surface being located completely around said bottom surface and extending from said outer side surface to a point radially inward of said securing means.

3. The rotary cutter of claim 2 wherein said circular disc further includes a center hole with a relief slot encircling said center hole at about the midpoint between said top surface and said bottom surface, said relief slot extending radially to a point inwardly of said securing means.

4. The rotary cutter of claim 1 wherein said tapered outer side surface includes an upper generally curved portion and a lower linear portion.

5. The rotary cutter of claim 1 further including the direction of taper of said tapered inside ring surface and said tapered outer side surface being inwardly in the direction toward said first surface.

6. The rotary cutter of claim 1 wherein said securing means comprise screws spaced about the circular disc.

7. The rotary cutter of claim 6 further comprising eight screws equidistantly spaced about said circular disc.

8. The rotary cutter of claim 2 further including relief slots spaced about said tapered outer side surface of said circular disc with said slots extending the thickness of said circular disc and projecting radially inward of said securing means.

9. The rotary cutter of claim 1 further including a key on said first surface of said cutter head located in a keyway in said base surface of said cutter ring.

10. In a rotary cutter for cutting gears and the like comprising:
a generally disc-shaped cutter head having a circumferential edge surface and an axis of rotation,
a cutter ring located on one side of said cutter head, said cutter ring including at least one stock removing surface located on a base portion with said base portion having an inside ring surface, a base surface, and an outside ring surface,
wherein the improvement comprises:
said one side of said cutter head including a inner wall surface located radially inwardly of said edge surface, said inner wall surface being concentric about said axis of rotation,
said cutter ring being in a radially expanded condition whereby said outside ring surface is seated against said inner wall surface and said base surface is seated against a first surface on said one side,
means located within said cutter ring effecting and maintaining said cutter ring in said radially expanded position whereby said cutter ring is centered on said cutter head concentrically about said axis.

11. The improved rotary cutter ring of claim 10 further comprising a slit in said cutter ring.

12. The improved rotary cutter of claim 10 wherein said means for effecting and maintaining comprise a circular disc.

13. The improved rotary cutter of claim 12 wherein said circular disc is deflectable and comprises a top surface, a tapered outer side surface and a bottom surface with a portion of said bottom surface comprising a relief surface, said relief surface being completely about said bottom surface and extending from said side surface to a point radially inward of said securing means.

14. The rotary cutter of claim 13 wherein said circular disc further includes a center hole with a relief slot encircling said center hole at about the midpoint between said top surface and said bottom surface, said relief slot extending radially to a point inwardly of said securing means.

15. The improved rotary cutter of claim 14 further including relief slots spaced about said tapered outer side surface with said slots extending the thickness of said circular disc and projecting radially inward of said securing means.

16. The improved rotary cutter of claim 12 wherein said tapered outer side surface includes an upper generally curved portion and a lower linear portion.

17. A rotary cutter for cutting gears and the like, said rotary cutter having an axis of rotation and comprising:
a generally disc-shaped cutter head comprising a circumferential edge surface and a first surface located on one side of said cutter head with said axis of rotation extending through the center of said cutter head, said first surface being perpendicular to said axis, said cutter head further including an inner wall surface located on said one side, said inner wall surface being located radially inwardly with respect to said edge surface and being concentric about and extending parallel to said axis of rotation,
a cutter ring located adjacent said one side of said cutter head, said cutter ring having at least one stock removing surface located on a base portion with said base portion having an inside ring surface, an outside ring surface, and a base surface with said outside ring surface being perpendicular to said base surface, said cutter ring being in a radially expanded condition whereby said outside ring surface is seated against said inner wall surface and said base surface is seated against said first surface,
expanding means located within said cutter ring and contacting said inside ring surface, said expanding means effecting and maintaining said cutter ring in said radially expanded position whereby said cutter ring is centered on said cutter head concentrically about said axis.

18. The rotary cutter of claim 17 wherein said expanding means comprises a circular disc having a top surface, a tapered outer side surface and a bottom surface.

19. The rotary cutter of claim 18 further including a portion of said bottom surface comprising a relief surface, said relief surface being located completely around said bottom surface and extending from said outer side surface to a point radially inward of said securing means.

20. The rotary cutter of claim 19 wherein said circular disc further includes a center hole with a relief slot encircling said center hole at about the midpoint between said top surface and said bottom surface, said relief slot extending radially to a point inwardly of said securing means.

21. The rotary cutter of claim 20 further including relief slots spaced about said tapered outer side surface of said circular disc with said slots extending the thickness of said circular disc and projecting radially inward of said securing means.

22. The rotary cutter of claim 21 further including a slit in said cutter ring.

23. The rotary cutter of claim 18 wherein said tapered outer side surface includes an upper generally curved portion and a lower linear portion.

24. The rotary cutter of claim 17 further including said inside ring surface being tapered with the direction of taper of said inside ring surface and said tapered outer side surface being inwardly in the direction toward said first surface.

25. A rotary cutter assembly having a plurality of components comprising:
a generally disc-shaped cutter head comprising a circumferential edge surface and a first surface located on one side of said cutter head with an axis of rotation extending through the center of said cutter head, said first surface being perpendicular to said axis, said cutter head further including an inner wall surface located on said one side, said inner wall surface being located radially inwardly with respect to said edge surface and being concentric about and extending parallel to said axis of rotation, an expandable cutter ring having at least one stock removing surface located on a base portion with said base portion having an inside ring surface, an outside ring surface, and a base surface with said outside ring surface being perpendicular to said base surface, expanding means locatable within said cutter ring for contacting said inside ring surface and effecting and maintaining said cutter ring in a radially expanded position wherein said outside ring surface is seated against said inner wall surface and said base surface is seated against said first surface whereby said cutter ring is centered on said cutter head concentrically about said axis.

26. The rotary cutter of claim 25 wherein said expanding means comprises a deflectable circular disc having a top surface, a tapered outer side surface and a bottom surface.

27. The rotary cutter of claim 26 further including a portion of said bottom surface comprising a relief surface, said relief surface being located completely around said bottom surface and extending from said outer side surface to a point radially inward of said securing means.

28. The rotary cutter of claim 27 wherein said circular disc further includes a center hole with a relief slot encircling said center hole at about the midpoint between said top surface and said bottom surface, said relief slot extending radially to a point inwardly of said securing means.

29. The rotary cutter of claim 28 further including relief slots spaced about said tapered outer side surface of said circular disc with said slots extending the thickness of said circular disc and projecting radially inward of said securing means.

30. The rotary cutter of claim 26 wherein said tapered outer side surface includes an upper generally curved portion and a lower linear portion.

31. The rotary cutter of claim 25 further including a slit in said cutter ring.

32. A mounting and centering arrangement for an expandable cutter ring having at least one stock removing surface located on a base portion with said base portion having a tapered inside ring surface, an outside ring surface, and a base surface with said outside ring surface being perpendicular to said base surface, said mounting and centering arrangement comprising:

a generally disc-shaped cutter head comprising a circumferential edge surface and a first surface located on one side of said cutter head with an axis of rotation extending through the center of said cutter head, said first surface being perpendicular to said axis, said cutter head further including an inner wall surface located on said one side, said inner wall surface being located radially inwardly with respect to said edge surface and being concentric about and extending parallel to said axis of rotation, expanding means locatable within said cutter ring for contacting said tapered inside ring surface and effecting and maintaining said cutter ring in a radially expanded position wherein said outside ring surface is seated against said inner wall surface and said base surface is seated against said first surface whereby said cutter ring is centered on said cutter head concentrically about said axis.

33. The rotary cutter of claim 32 wherein said expanding means comprises a circular disc having a top surface, a tapered outer side surface and a bottom surface.

34. The rotary cutter of claim 33 further including a portion of said bottom surface comprising a relief surface, said relief surface being located completely around said bottom surface and extending from said outer side surface to a point radially inward of said securing means.

35. The rotary cutter of claim 34 further including relief slots spaced about said tapered outer side surface of said circular disc with said slots extending the thickness of said circular disc and projecting radially inward of said securing means.

36. The rotary cutter of claim 34 wherein said circular disc further includes a center hole with a relief slot encircling said center hole at about the midpoint between said top surface and said bottom surface, said relief slot extending radially to a point inwardly of said securing means.

37. The rotary cutter of claim 33 wherein said tapered outer side surface includes an upper generally curved portion and a lower linear portion.

38. The rotary cutter of claim 32 further including a slit in said cutter ring.

* * * * *